United States Patent [19]
Albaric et al.

[11] 3,939,368
[45] Feb. 17, 1976

[54] LIQUID-COOLED ROTOR FOR DYNAMOELECTRIC MACHINES

[75] Inventors: Jacques E. Albaric, Pittsburgh; Charles W. Burkhart, North Huntingdon; Warren W. Jones, Acme, all of Pa.

[73] Assignee: Westinghouse Electric Corporation, Pittsburgh, Pa.

[22] Filed: June 25, 1974

[21] Appl. No.: 482,912

[52] U.S. Cl. .................................. 310/59; 310/43
[51] Int. Cl.² ......................................... H02K 9/00
[58] Field of Search ............ 310/52, 54, 58, 59, 60, 310/61, 64, 65, 43, 45, 71, 60 A

[56] References Cited
UNITED STATES PATENTS

| | | | |
|---|---|---|---|
| 3,131,321 | 4/1964 | Gibbs | 310/64 |
| 3,469,125 | 9/1969 | Kranz | 310/64 |
| 3,543,062 | 11/1970 | Banchieri | 310/64 |
| 3,718,830 | 2/1973 | Philofsky | 310/43 |
| 3,733,502 | 5/1973 | Curtis | 310/61 |

*Primary Examiner*—R. Skudy
*Attorney, Agent, or Firm*—George M. Medwick

[57] ABSTRACT

A liquid-cooled rotor is provided for large dynamoelectric machines, such as turbine generators, in which a coolant liquid such as water is supplied through a shaft bore and radial passages to an annular distribution chamber on the surface of the rotor. Water flows from the chamber to the rotor winding, and back to the chamber, through insulating hoses which are distributed about the circumference of the chamber, and coolant tubes are connected to the insulating hoses to carry the liquid to and from the rotor winding. The tubes are brought together in groups in a transition region from which they extend into slots in the surface of the rotor. The tubes are disposed in the transition region so as to minimize the space required and are supported against rotational forces in a manner to facilitate manufacture and repair. For this purpose, they are formed by bending to bring them into groups of the required number of tubes and are held in place on the rotor by masses of resin cast in place and subdivided so that individual groups of tubes can be removed and replaced independently of the other tubes.

5 Claims, 6 Drawing Figures

LIQUID-COOLED ROTOR FOR DYNAMOELECTRIC MACHINES

BACKGROUND OF THE INVENTION

The present invention relates to the cooling of dynamoelectric machines such as large turbine generators, and more particularly to the means for supplying coolant liquid to the windings of liquid-cooled rotors for such machines.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system which has made it possible to attain very high ratings for large generators. The coolant fluid used in these machines heretofore has usually been hydrogen which fills the gas-tight housing and is circulated through the ducts of the stator and rotor windings and through radial or axial ducts in the stator core. As further increases in the maximum capacities of these large generators have become necessary, further improvements in cooling have been required and have been obtained by the use of more efficient coolant fluids such as liquids. A very considerable improvement in cooling has been obtained in this way by circulating a liquid coolant such as water through the ducts of the stator winding, and a substantial further improvement can be obtained by similarly circulating a coolant liquid through passages in the rotor winding.

Coolant liquid such as water is preferably supplied to the rotor of a large generator, and discharged therefrom, through the shaft bore so that the sealing problem can be minimized by introducing and discharging the liquid at locations of minimum radius where the centrifugal force on the liquid is at a minimum. When the liquid is thus introduced through the shaft, it flows from the bore through radial passages to an annular distribution chamber on the surface of the rotor from which it can be distributed to the conductors of the rotor winding through suitable tubes or hydraulic connectors. After flowing through the rotor conductors, the heated coolant may flow through similar tubes and passages at the opposite end of the rotor and be discharged through a central bore at that end, or it may return to the same end at which it entered to be discharged. Arrangements of this general type are shown, for example, in the U.S. Pat. Nos. to Curtis et al, 3,733,502 and Gibbs et al, 3,131,321, and in a copending application of F.P. Fidei et al, Ser. No. 444,582, filed Feb. 21, 1974 and assigned to the Assignee of the present invention.

In this type of construction, the tubes through which the coolant flows to and from the winding are preferably placed in longitudinal slots in the rotor shaft and connected to the winding conductors in the end turn portions of the winding. The annular distribution chamber extends completely around the shaft and insulating hoses or connectors are provided for flow of liquid from the chamber and return thereto. The insulating hoses correspond in number to the number of coolant tubes and are distributed around the circumference of the annular chamber. The individual coolant tubes are connected to these insulating hoses and extend from the hoses into the axial slots, the necessary number of tubes being placed in each slot for connection to the individual winding conductors. The tubes must thus be brought inward from the radius of the distribution chamber to the radius of the slots, and brought together into groups of the appropriate numbers of tubes. The tubes therefore pass through a transition region in which they are formed in a manner to bring them into the necessary groups, and they must be adequately supported in this region against the high rotational forces to which they are subjected during operation and in a manner to prevent significant cycling stresses which could result in fatigue. The arrangement should also be such that the tubes can be manufactured and assembled on the rotor without unusual difficulty and at a reasonable cost, and so that possible removal and replacement of tubes or groups of tubes for repair purposes is facilitated to minimize the time and cost involved. It is also desirable to minimize the space required for this transition region in order to avoid any undue increase in the length of the rotor.

SUMMARY OF THE INVENTION

The present invention provides a rotor construction for large liquid-cooled turbine generators in which coolant liquid such as water is supplied to the rotor winding from an annular distribution chamber through coolant tubes arranged and supported in a manner which meets the requirements discussed above.

In accordance with the invention, coolant liquid is supplied to the rotor, and preferably also discharged, through the shaft bore at the exciter end of the rotor. The liquid flows through the shaft bore and through radial passages to and from the annular distribution chamber encircling the surface of the rotor. The liquid is directed to and from the individual winding conductors by means of coolant tubes which are placed in longitudinal slots in the shaft surface and connected to the distribution chamber by insulating hoses or connectors. The connectors are spaced around the circumference of the distribution chamber and the tubes pass through a transition region in which they are brought into spaced groups of tubes to be placed in the slots. The tubes are bent and formed in the transition region in such a manner that substantially all bends are 90° bends and that all tubes lie in longitudinal or normal planes or in cylindrical surfaces concentric with the shaft axis. In this way, the tubes can easily be brought into groups containing the proper number of tubes for each of the slots, and the arrangement is such that the space required is kept to a minimum. The tubes are supported in position by masses of resin which are preferably cast in place around the tubes after they have been installed on the rotor. Adjacent sets of tubes in the transition region are separated by radial wall members, and the resin is cast in the spaces between these walls so that each set of tubes can be installed and removed independently of the remaining tubes, thus facilitatingg both the original manufacture of the rotor and removal and replacement of the tubes if repairs should become necessary.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 5:
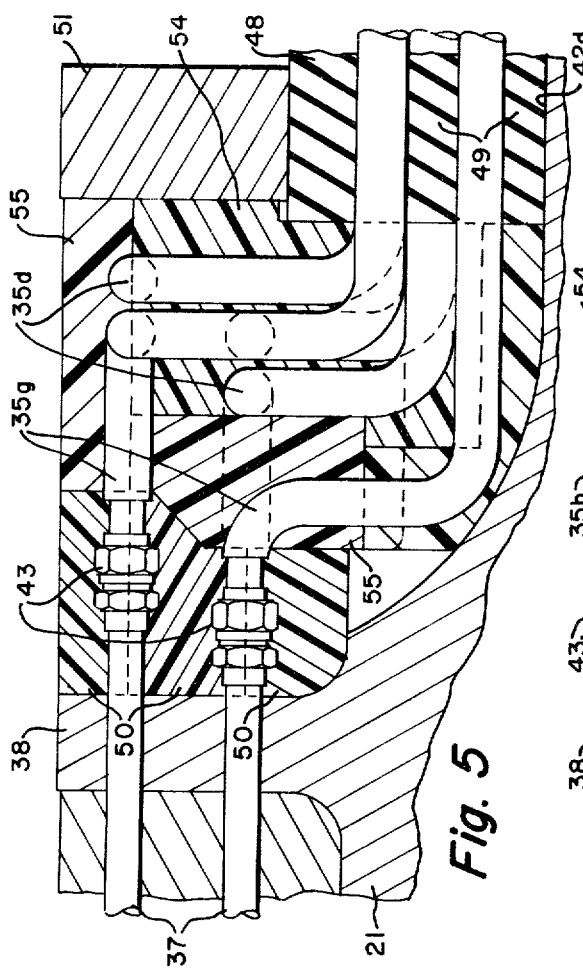
FIG. 5 is a fragmentary longitudinal sectional view substantially on the line V—V of FIG. 3.
Figure 6:
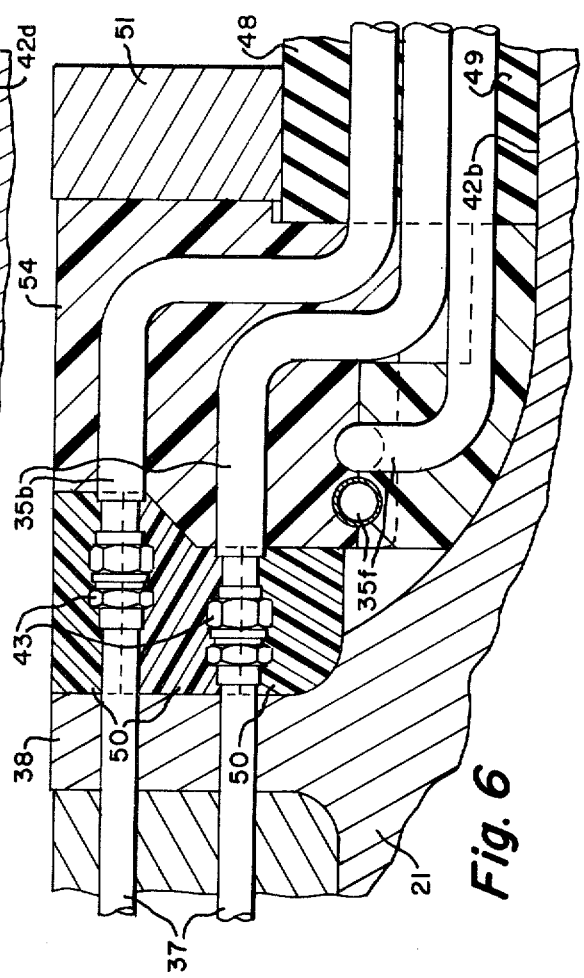
FIG. 6 is a fragmentary longitudinal sectional view substantially on the line VI—VI of FIG. 3.

The invention is shown in the drawings embodied in a liquid-cooled rotor for use in a large turbine generator of typical construction, although it should be understood that the invention may be applied to any desired type of dynamoelectric machine.

Figure 1:
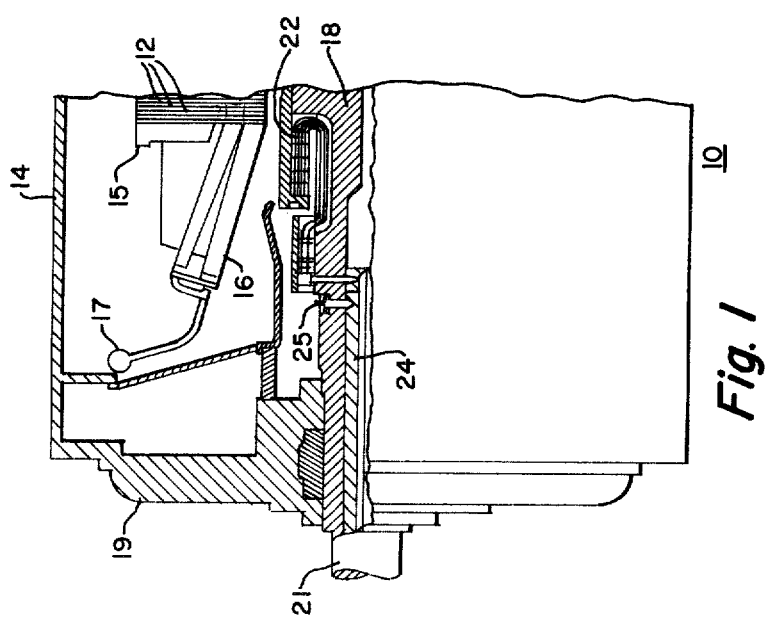
FIG. 1 is a view, partly in longitudinal section and partly in elevation, of a turbine generator embodying the invention.

Referring first to FIG. 1, there is shown a large generator 10 which has a stator core 12 supported in a substantially gas-tight outer housing 14. The core 12 is of the usual laminated construction having a generally cylindrical bore therethrough, and the laminations are clamped between suitable end plates 15 in the usual manner. The stator core 12 has longitudinal slots in its inner periphery for reception of a stator winding 16 which may be of any suitable or usual type. The winding 16 is shown as being a liquid-cooled winding and circular inlet and discharge manifolds 17 are provided at opposite ends of the machine for circulating a coolant liquid such as water through the coils of the stator winding. The housing 14 is filled with coolant gas, preferably hydrogen, which is circulated through the interior of the housing in the usual manner and suitable baffling of any desired type may be provided in the housing to direct the flow of gas therein. The machine has a rotor 18 which is disposed in the bore of the stator core 12 and supported in end brackets 19 at each end of the housing 14 in bearing assemblies of any desired type which may include gland seals to prevent leakage of gas from the housing.

Figure 2:
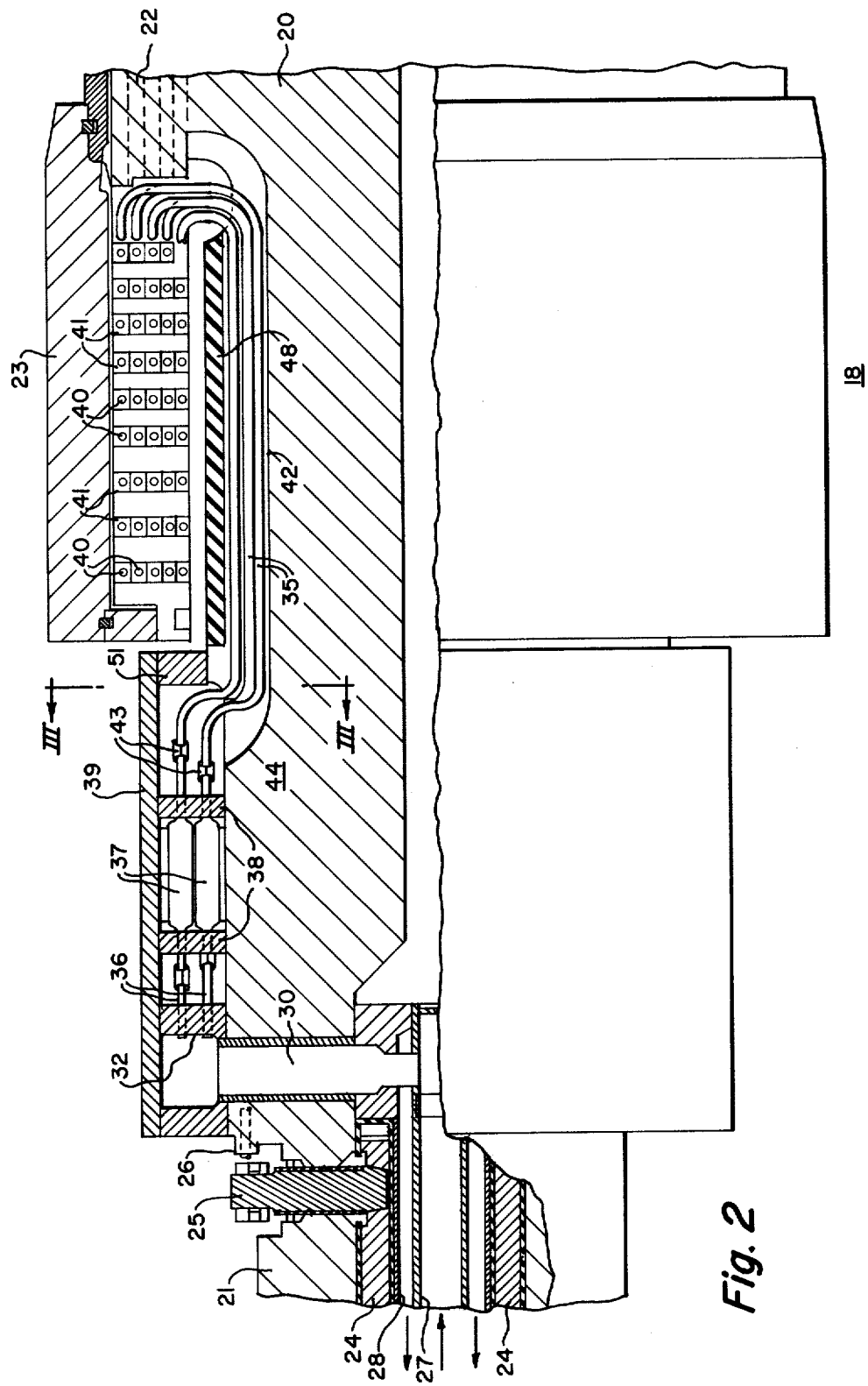
FIG. 2 is a longitudinal sectional view on a larger scale showing one end of the rotor.

As shown more clearly in FIG. 2, the rotor 18 has a body portion 20 and shaft portions 21 which are preferably integral with the body portion and extend axially from each end thereof. The body portion 20 is provided with peripheral slots in the usual manner for reception of a rotor winding 22. The rotor winding 22 constitutes the field winding of the generator 10 and may comprise the usual concentric, multi-turn coils disposed to form either two or four poles in the usual manner. The coils extend beyond the ends of the body portion 20 at each end of the rotor and the end turn portions of the coils are supported against rotational forces by the usual heavy retaining rings 23. Excitation current for the winding 22 is supplied from a suitable exciter or other direct current source through insulated axial conductors 24 disposed in a central bore of the rotor shaft 21. Radial leads 25 extend through the shaft 21 and are threaded into the conductors 24. The radial leads 25 are connected to the winding 22 by means of suitable axial leads 26 of any desired type.

As previously indicated, the rotor winding 22 is cooled by circulation of a coolant liquid, preferably water. The water is supplied through the bore of the shaft 21 and preferably is both introduced and discharged at the same end of the machine. As shown in the drawings, two concentric stainless steel tubes 27 and 28 are disposed in the bore of the shaft 21 on the axis thereof, the tube 27 forming a central passage for entrance of water and the tubes 27 and 28 forming an annular passage between them for discharge of water. Coolant water entering through the tube 27 flows through radial passages 30 in the shaft 21 to an annular distribution chamber 32 extending around the shaft on the surface thereof. The passages 30 are preferably lined with stainless steel liners and the chamber 32 is also made of stainless steel, although any suitable corrosion-resistant material could be used. Water flows from the chamber 32 through stainless steel coolant tubes 35 to the winding 22 as more fully described hereinafter. The water flows through the winding 22 and, if desired, may flow to the opposite end of the rotor and be discharged through a distribution chamber, radial passages and shaft bore similar to those shown in FIG. 2. In the preferred embodiment, however, the water returns through the winding to the same end of the rotor and is discharged through others of the tubes 35 to the annular chamber 32. In this arrangement, as more fully disclosed in the above-mentioned copending application, the chamber 32 is divided by internal partitions into entrance and discharge portions, and the discharged coolant flows through radial passages similar to the passages 30 to the annular discharge passage between the tubes 27 and 28 for discharge from the machine.

Figure 3:
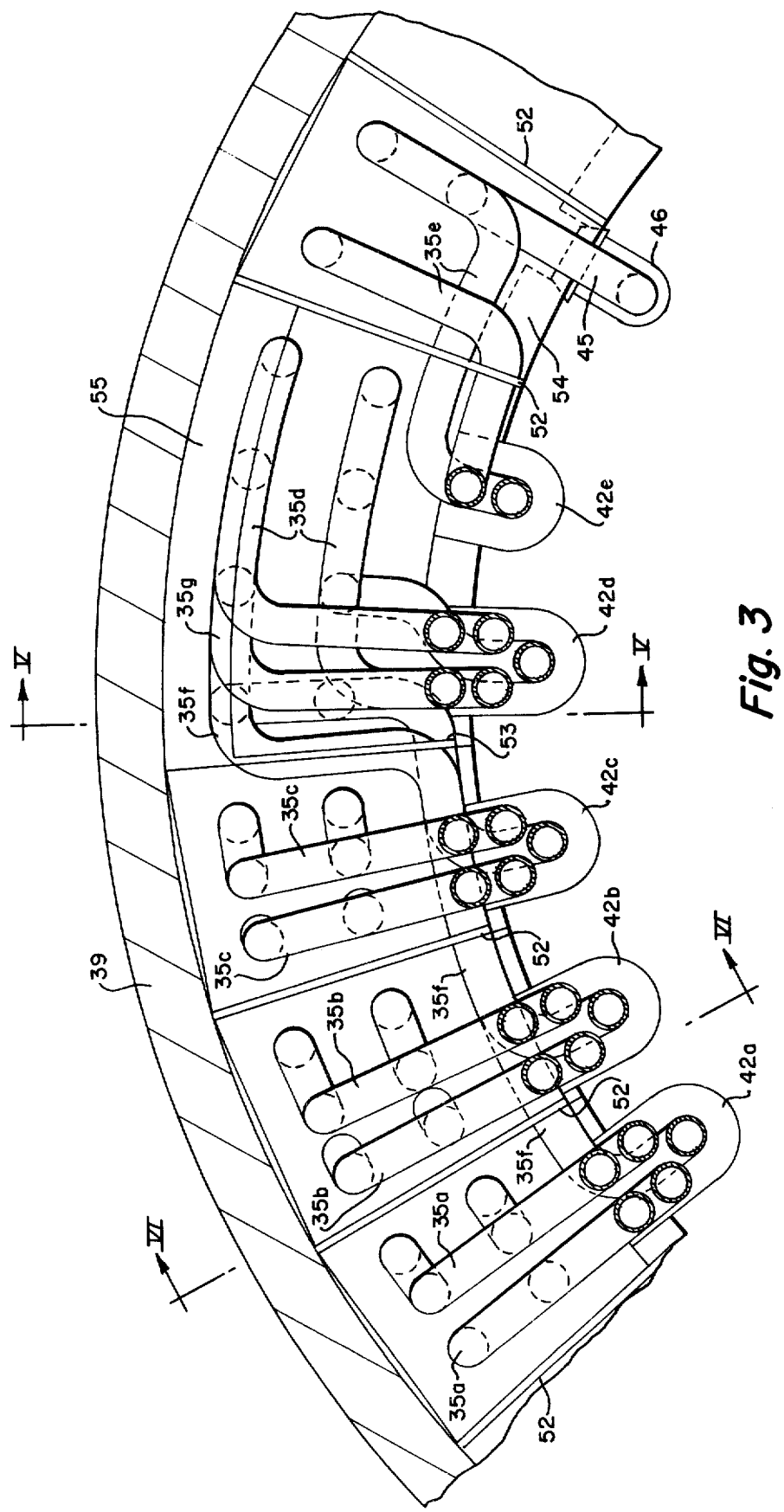
FIG. 3 is a partial transverse sectional view of the rotor substantially on the line III—III of FIG. 2.

Water flows between the annular distribution chamber 32 and the winding 22 through axially-extending water connectors 36 which are brazed or otherwise secured in the wall of the chamber 32 on the side toward the rotor body 20. The connectors 36 are distributed about the circumference of the chamber 32 and are arranged in two radially-spaced rows as can be seen in FIG. 3, which shows substantially one quadrant of the circumference, the other quadrants being similar. Preferably, the connectors 36 are disposed in radially-aligned pairs as shown. The conducting coolant tubes 35 are connected to the electrically energized winding 22 and must, therefore, be insulated from the grounded parts of the water system. For this purpose, insulating hoses 37 are provided. The hoses 37 may be of any suitable type which provides sufficient insulation to ground and which is capable of carrying the desired flow of water while withstanding the stresses to which the hoses are subjected. A hose 37 is connected to each of the connectors 36 and extends longitudinally in alignment therewith. As shown in FIG. 2, the ends of the hoses 37 are supported in flanges 38 on the rotor shaft 21. The connectors 36 and hoses 37 may be supported in position by any desired type of insulating blocks in the spaces between the flanges, and retained by a ring 39 shrunk or otherwise secured on the rotor and which may be integral with the outer wall of the chamber 32 as shown.

The rotor winding 22 may be either a two pole or four pole winding, as mentioned above. The winding 22 preferably consists of the usual rectangular coils having longitudinal conductors extending through the slots of the rotor body and circumferential end turn portions joining the ends of the longitudinal portions beyond the ends of the rotor body. The coils are preferably made up of conductors 40 of generally rectangular cross section with central passages 41 extending through them for circulation of the coolant water, as can be seen in the end turn portions which are visible in FIG. 2. Coolant water is supplied through the tubes 35 to flow through the passages 41 of the winding and the tubes 35 are preferably connected to individual conductors 40. For this purpose, the tubes 35 are placed in slots 42 extending longitudinally in the surface of the shaft 21. The tubes extend under the end turn portions of the winding to the body 20 of the rotor and then extend radially outward and may be connected to the winding conductors in the manner more fully disclosed and claimed in a copending application of F.P. Fidei et al., Ser. No. 479,386, filed June 15, 1974, and assigned to the Assignee of the present invention. It will be understood, of course, that the tubes 35 may be connected to the winding conductors in any desired manner to provide circulation of coolant liquid through the conductors.

Each of the tubes 35 is connected to one of the insulating hoses 37 by a suitable joint or connection 43. The tubes 35 thus extend through a transition region generally indicated at 44 from the axially-extending hoses 37 into the slots 42. Since the tubes 35 are connected to individual conductors 40 of the winding, each slot 42 must contain the appropriate number of tubes to make the connections in the desired manner. Thus, for example, in the preferred embodiment shown in the drawings, the winding 22 is a two-pole winding having nine coils in each pole, and each coil comprises five turns or conductors 40 except the innermost coil which has four conductors. This requires the tubes 35 for the coil sides on one side of each pole, that is, the tubes on one-fourth of the circumference of the two-pole rotor, to be arranged as shown in FIG. 3, with five tubes in each of four slots 42 and two tubes in the last slot nearest the pole center. This permits connection of the tubes to the conductors in the manner shown in the last above-mentioned copending application, in which groups of tubes are disposed alternately on opposite sides of the coils except for the innermost coil in which two tubes are disposed on each side of the four-turn coil.

Figure 4:
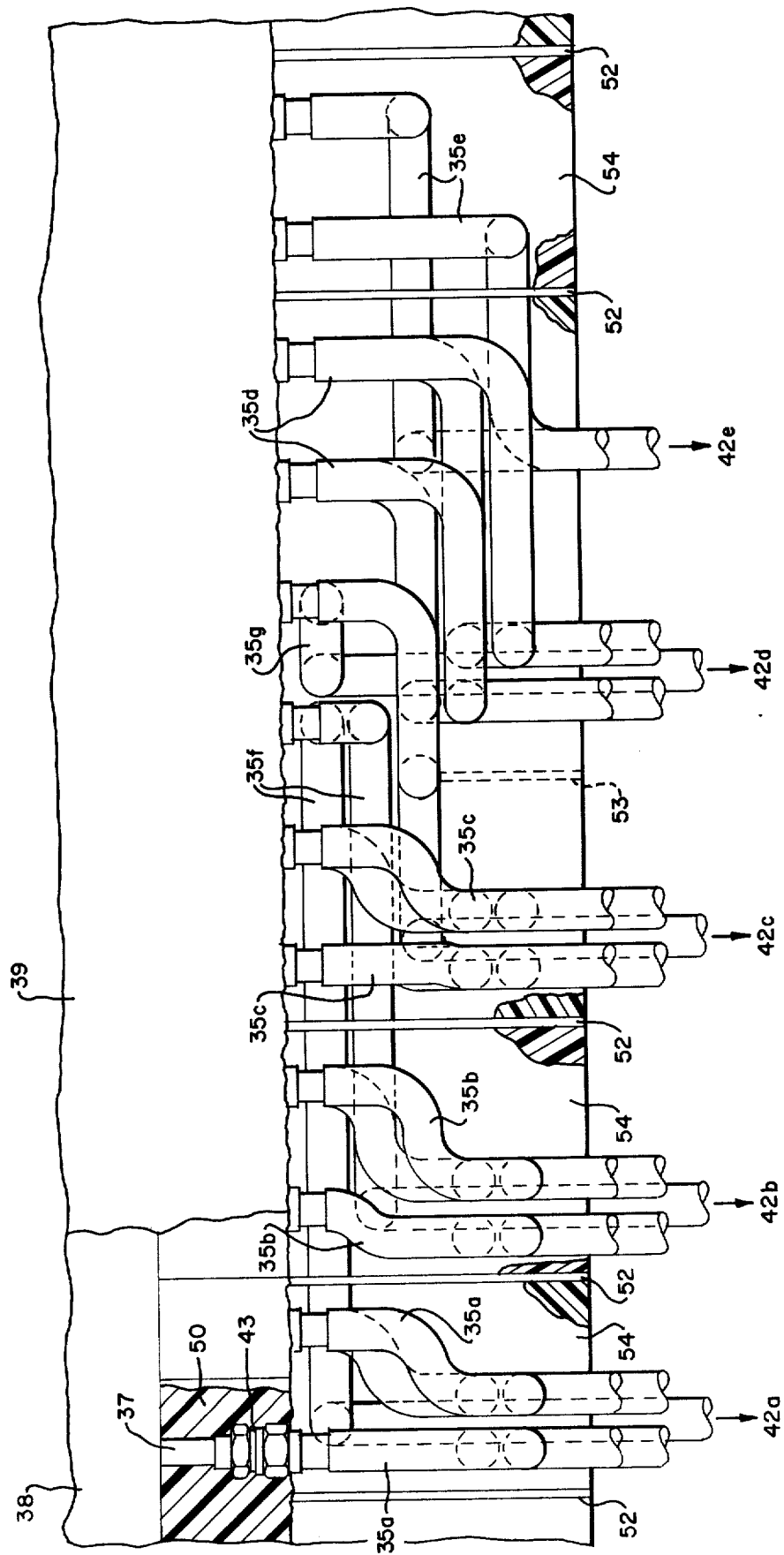
FIG. 4 is a developed plan view of the portion of the rotor shown in FIG. 3.

It will be seen, therefore, that it is necessary to form the tubes 35 in the transition region 44 in such a manner that the five tubes in each slot 42 are connected to circumferentially spaced pairs of insulating hoses 37 and in a manner to occupy as little space as possible. This may be done in the manner shown in FIGS. 3 and 4 for the particular number and arrangement of tubes described above. These figures show the coolant tubes for the conductors of the coil sides on one side of one pole of a two-pole rotor with a winding as described above, the pole center being at the right. The tubes 35a connected to the first two pairs of hoses 37 at the outside of the pole are bent radially and circumferentially as shown into position to enter the first slot 42a, thus providing four tubes for that slot. The next two pairs of tubes 35b are similarly bent to enter slot 42b and the adjacent two pairs of tubes 35c are formed to enter slot 42c. Four tubes are thus provided in each of the first three slots. The two tubes 35f connected to the next radial pair of hose connectors are bent in the manner shown to extend radially downward and then circumferentially to the first two slots 42a and 42b, respectively, to provide the fifth tubes for these slots. The next pair of tubes 35g are similarly formed to provide the fifth tube for the slots 42c and 42d. The next two pairs of tubes 35d are formed as shown to extend circumferentially and radially to provide four tubes for the slot 42d. The two tubes 35e for the slot 42e come from a single hose connector and from one of the last pair of connectors, respectively. The remaining hose connector in the last pair nearest the pole center may, if desired, be connected to a tube 45 extending back in the opposite direction through a small slot 46 to provide coolant for the lead 26.

It will be seen that the coolant tubes 35 are formed and arranged in the transition region 44 in a manner which brings them into groups of the desired numbers of tubes at a smaller radius than that of the insulating hoses for entrance into the slots 42. The arrangement is such that substantially all bends in the tubes are 90° bends, and that all portions of the tubes lie in either longitudinal or normal planes with respect to the axis of the shaft, or in cylindrical surfaces concentric with the axis. In this way, an arrangement is provided in which the forming of the tubes is relatively simple and which is easily assembled while a minimum amount of space is required for the transition region. A particular embodiment has been shown for the purpose of illustration but it will be apparent that similar arrangements can be worked out for any other number of slots or number of tubes per slot required by any particular winding configuration.

As previously mentioned, it is necessary to rigidly support the tubes 35 against the high centrifugal forces which occur in operation, but in such a manner that the supporting means can be manufactured and assembled without undue difficulty and that the tubes can be removed and replaced in a reasonable time if repairs should become necessary. The slots 42 are closed by wedges 48 and rigid blocks 49 are disposed around the tubes 35 within the slots 42 to support the tubes against movement. In the transition region 44, two types of support may be utilized. In the region around the connections 43, blocks 50 of rigid insulating material are placed in position around the tubes and joints. These blocks are easily made to the proper dimensions since the spaces which they occupy are regular and of reasonably uniform dimensions, and a minimum of cutting and fitting is required to fit the blocks into place. These blocks 50 are utilized in order to permit easy access to the coupling 43 if it should become necessary to remove any of the tubes, and the blocks 50 form a boundary at one side of the transition region.

At the other side of the transition region, a ring 51 encircles the rotor at the ends of the slots 42. The ring 51, wedges 48 and blocks 49 provide a boundary at that side of the transition region. The tubes 35 in the transition region are supported in a mass of a suitable resin which is cast in place, so as to fill the irregular spaces and openings between and around the tubes without requiring cutting and fitting of many small irregularly shaped blocks. To facilitate manufacture and replacement, the tubes are divided into sets by generally radial wall members 52. It will be seen in FIG. 3 that except in one place the tubes can easily be divided into sets by the walls 52 which extend radially from the rotor shaft surface to the ring 39 and longitudinally to the blocks 50. Where a complete wall cannot be utilized because of the position of the tubes, a partial wall may be provided. The required supports for the tubes are then provided by pouring a suitable resin 54 into the spaces between the walls 52, bounded by the blocks 50 on one side and by the ring 51, slot wedges 48 and blocks 49 on the other side, the walls and blocks forming, in effect, a series of molds for the resin. Where a partial wall 53 is used, the resin 54 is poured in up to the top of the wall and since reasonably regular spaces then remain, additional rigid blocks 55 are used to fill these spaces. The shrink ring 39, which preferably extends over the transition area as shown, engages the molded resin areas and completes the support for the tubes.

The walls 52 may be made of any suitable insulating material which will not adhere to the resin or which can be made non-adherent by coating with a suitable material such as a silicone oil. The resin 54 itself may be any suitable material such as a glass-filled epoxy resin, or a polyurethane resin, which can be cast in place. A resin which will cure at room temperature is preferred because the size of the rotor makes it difficult to cure the resin in an oven. It will be seen that the tubes 35 are thus rigidly supported in the transition region by the cast resin and the insulating blocks, the support being completed by the retaining ring 39. Suitable fillers are used, if necessary, between the resin and the ring. The tubes are thus rigidly supported against centrifugal forces, and in a manner which prevents cyclical stresses such as might lead to fatigue failure since movement of the tubes is prevented. If repair or replacement of any of the tubes becomes necessary, they can be removed in small sets after removal of the retaining ring 39 and the appropriat blocks 50. The corresponding joints 43 can then be opened and the individual sets or groups of tubes between walls 52 can be removed without disturbing the remaining tubes. Thus, repair is made relatively simple and only the tubes involved have to be removed or disturbed.

It should now be apparent that an arrangement has been provided for the coolant tubes of a liquid-cooled rotor in which the tubes are arranged in a transition region to bring them into the desired groups for connection to the individual conductors of the rotor winding and in a manner which permits manufacture without undue difficulty and which requires a minimum of space on the rotor. Means are also provided for rigidly supporting the tubes in position during operation in a way which makes repair and replacement of any of the tubes relatively easy. A specific arrangement has been shown and described for the purpose of illustration, but it will be apparent that numerous other arrangements and embodiments are possible and all such modifications are within the scope of the invention.

What is claimed is:

1. A rotor for a dynamoelectric machine comprising:
    a shaft portion having an axis extending therethrough and a body portion carrying windings, said windings including conductors having passages for circulation of a liquid coolant therethrough,
    an annular coolant chamber encircling said shaft portion,
    means for supplying liquid coolant to said chamber,
    a plurality of connectors disposed in radially-spaced circular rows extending circumferentially in one wall of the chamber,
    a plurality of insulating hoses being joined to each of said connectors and extending axially in alignment therewith,
    means for supporting said connectors and hoses in position on the shaft,
    a plurality of slots extending longitudinally in the surface of the shaft portion under the end portions of said windings,
    a plurality of coolant tubes connected to said insulating hoses, said coolant tubes having axial portions extending axially from said hoses through a transition region, said tubes being disposed in a predetermined arrangement in said transition region to bring them into groups at a smaller radial distance from the shaft axis than said hoses, each group of tubes extending axially in one of said slots for connection of the tubes to the winding conductors, and
    means in said transition region for isolating said coolant tubes into sets of tubes and for rigidly supporting in position said tubes in each set, said isolating and supporting means comprising;
        wall members extending radially in said transition region between said coolant tubes to isolate said tubes into said sets, said walls defining spaces containing said tubes within each set therebetween, and,
        a mass of resin surrounding and enclosing each set of tubes in said spaces between said wall members,
        blocks of rigid insulating material enclosing and supporting said axially extending portions of said tubes between said mass of resin and said insulating hoses, and,
        rigid insulating blocks supporting said axially extending groups of tubes in said slots, said masses of resin being confined between said walls and said insulating blocks on both sides thereof.

2. A rotor member as defined in claim 1 in which said resin is cast in place.

3. A rotor member as defined in claim 1, wherein said predetermined arrangement simultaneously exhibits the following characteristics:
    a. there is a one-to-one correspondence between coolant tubes located on the shaft axially prior to said transition region and between coolant tubes grouped into said groups and extending axially within said slots;
    b. all of said coolant tubes are substantially equiangularly disposed about the periphery of said shaft at the axial location on said shaft where said tubes are connected to said hoses, at least one of said tubes bending within said transition region to follow each of a predetermined plurality of normal planes within the shaft;
    c. each of said coolant tubes being disposed in one of a plurality of radial planes emanating from the axis of the shaft as said tubes extend axially from said connectors, and each of said slots in which said tubes are grouped being disposed to follow others of said plurality of said radial planes; and,
    d. all of said coolant tubes being disposed within the radially outmost and the next-radially outmost of a plurality of concentric cylindrical surfaces defined within said shaft as said coolant tubes are connected to said hoses, all of said coolant tubes beng disposed in others of the plurality of concentric cylindrical surfaces as said coolant tubes extend axially in said groups in said slots.

4. A rotor member as defined in claim 3, wherein said groups of coolant tubes are brought together in said slots in numbers corresponding to the number of individual conductors of the rotor winding to which the tubes are connected.

5. A rotor member as defined in claim 3, wherein said insulating hoses and said connectors are disposed in radially aligned pairs in said radially outmost and said next-radially outmost of said concentric surfaces, and wherein,
    at least some of the groups of said coolant tubes in said slots have more than two tubes therein.

* * * * *